United States Patent
Pesonen

(10) Patent No.: US 7,699,233 B2
(45) Date of Patent: Apr. 20, 2010

(54) METHOD FOR ISSUER AND CHIP SPECIFIC DIVERSIFICATION

(75) Inventor: Lauri Pesonen, Espoo (FI)

(73) Assignee: Nokia Corporation, Espoo (FI)

( * ) Notice: Subject to any disclaimer, the term of this patent is extended or adjusted under 35 U.S.C. 154(b) by 670 days.

(21) Appl. No.: 11/264,139

(22) Filed: Nov. 2, 2005

(65) Prior Publication Data

US 2007/0095927 A1    May 3, 2007

(51) Int. Cl.
*G06K 19/06*    (2006.01)

(52) U.S. Cl. .................... 235/492; 235/472.02

(58) Field of Classification Search .......... 235/492, 235/472.02, 487; 713/168, 169, 172, 173; 455/410, 411, 418, 419
See application file for complete search history.

(56) References Cited

U.S. PATENT DOCUMENTS

| | | | |
|---|---|---|---|
| 5,745,571 A * | 4/1998 | Zuk | 380/285 |
| 6,212,634 B1 * | 4/2001 | Geer et al. | 713/156 |
| 7,246,242 B1 * | 7/2007 | Niemi et al. | 713/181 |
| 2003/0236983 A1 * | 12/2003 | Mihm, Jr. | 713/172 |
| 2005/0153741 A1 * | 7/2005 | Chen et al. | 455/558 |

FOREIGN PATENT DOCUMENTS

| | | | |
|---|---|---|---|
| GB | 2389272 A | * | 3/2003 |
| GB | 2389272 | | 12/2003 |
| WO | WO 04002054 | | 12/2003 |
| WO | WO 2005036916 | | 4/2005 |

OTHER PUBLICATIONS

International Search Report, PCT/IB2006/003037, Mail date Feb. 28, 2007.

* cited by examiner

*Primary Examiner*—Kumiko C Koyama
(74) *Attorney, Agent, or Firm*—Banner & Witcoff, Ltd.

(57) ABSTRACT

A system and method for initializing secure elements for use in mobile devices. A mobile device manufacturer embeds uninitialized secure elements into mobile devices. An issuer-specific seed value is securely passed into an initialization routine in the operating system of the secure element. The initialization routine diversifies the initial root keys on the secure element with the issuer seed and the unique chip serial number to create master and chip keys for use in secure communications between the issuer and the mobile device user.

45 Claims, 7 Drawing Sheets

METHOD FOR ISSUER AND CHIP SPECIFIC DIVERSIFICATION

FIELD OF THE INVENTION

The present invention generally relates to systems and methods for installing and initializing secure element chips for use in mobile devices. More specifically, the present invention relates to systems and methods for securely and efficiently tailoring secure element chips to different mobile device issuers.

BACKGROUND OF THE INVENTION

The evolution of e-commerce has seen the emergence of smart card technology as an attractive solution for a range of commercial and security applications. Smart cards provide security for data storage and transactions by serving as secure portable tokens providing digital identity, hardware-based authentication, and cryptographic key storage. Many smart cards bear a resemblance to regular magnetic stripe credit cards that allow consumers to make secure transactions in stores and over the Internet. However, smart cards differ in that they use an embedded computer chip rather than a magnetic stripe. This chip allows the card to function much in the same way as a personal computer. As smart cards have become less expensive and more powerful over recent years, a broad range of industries, including telecommunications, and especially mobile devices, have rapidly adopted smart card technology by including smaller smart cards into mobile device handsets.

Smart cards in wireless devices such as mobile phones can store subscriber profile information, such as, for example, information relating to available network services and the subscriber's encoded network identification data including, for example, the telephone number of the subscriber, the subscriber's PIN, and other user data such as contact information. Smart cards contain all the key information required to activate the phone and authenticate subscriber to the network. It is desirable that such cards be secure, so that an untrusted party in possession of the mobile device or the card cannot learn the information contained on the memory of the card. It is further desirable that communications to and from the mobile device that make use of the secure-sensitive information may be encrypted to prevent malicious parties from acquiring the secure information during its transmission. Smart cards with secure element chips that store data in the smart card memory and allow for the encrypted communication of this data can provide mobile device users with secure network access, and protection from fraud and identity theft, and greater business flexibility. However, before secure communications can take place, a smart card must be installed and initialized into a mobile device in such a manner as to prevent untrusted parties from obtaining any of the encryption keys, seed values, or secure internal data.

FIG. 1 is a diagram demonstrating a known method for installing and initializing secure element chips into mobile terminals. The large boxes of FIG. 1 represent the different entities which interact during the installation and initialization process. The smart card vendor 110 produces cards with embedded secure element chips for use in mobile devices. The device vendor 120 manufactures mobile devices, such as mobile phones. The issuer 130 is the wireless service provider who will be responsible for managing the device and supporting secure wireless transactions after the mobile device has been distributed to a user. The retail outlet 140 assembles the secure element chips into mobile devices and distributes the devices to users.

The process of installing and initializing secure element chips shown in FIG. 1 begins when the smart card vendor 110 manufactures the smart cards containing initial keys in step 101. In step 102, the issuer 130 generates the master keys, stores a copy of them in a database, and then securely transmits them to the smart card vendor 110. The smart card vendor 110 uses the master keys received from the issuer 130 and the chip serial numbers to initialize the smart card chips in step 103. The smart card vendor 110 then securely transmits the chip serial numbers back to the issuer 130 in step 104. The issuer 130 stores these serial numbers in the database with the master keys in step 105, so that the issuer 130 now has both the master keys and the chip serial numbers necessary to manage the chips and to support secure wireless communications for the mobile device.

After initializing the smart card chips, the smart card vendor 110 sends the cards to a retail outlet 140 in step 106. Concurrently, in step 107, the device vendor 120 sends its mobile devices to the retail outlet 140. The retail outlet 140 assembles the initialized smart cards into the mobile devices in step 108, and can now distribute the devices to consumers in step 109.

The above-described method divides the manufacturing of mobile devices into two distinct steps: the manufacturing of the device itself, and the assembly of the initialized smart card into the mobile device. These steps are suitable in situations where the smart cards are detachable from the mobile device. However, the above method reduces the business flexibility of all entities involved, by shipping and installing only 'pre-personalized' secure element chips into mobile devices. Recently, there has arisen a need for equipping mobile devices with terminal-integrated smart card chips, which makes the above process of using 'pre-personalized' secure element chips unsuitable as the secure element chips need to be 'personalized' to the issuer only after the chips have been integrated into the mobile devices. Accordingly, there remains a need for an improved method for installing and initializing terminal-integrated secure element chips into mobile devices.

SUMMARY OF THE INVENTION

In light of the foregoing background, embodiments of the present invention provide an improved method for installing and initializing secure element chips into mobile devices. In one aspect of the present invention, a smart card manufacturer creates smart cards with embedded but uninitialized secure element chips. The smart cards are shipped to a mobile device manufacturer/vendor in an uninitialized state, rather than pre-personalized to a specific issuer. The uninitialized smart cards may contain pre-installed encryption keys and a unique chip serial number, and may support an initialization routine that can be invoked by the device vendor to personalize the secure element to a specific issuer.

Another aspect of the present invention allows for an issuer of the mobile device, along with the smart card vendor and the device vendor, to initialize the mobile device specifically to the issuer. The issuer may obtain the transfer key and MAC seed values corresponding to the secure element from the smart card vendor. The issuer may then encrypt its own issuer seed value with this transfer key, and transmit this data to the device vendor. The issuer may further encrypt the MAC seed value with its issuer seed and transmit this data to the device vendor. The device vendor may then invoke the smart card initialization routine with the data received from the issuer. This routine will configure the smart card for secure communications by creating issuer-specific and chip-specific keys based on its pre-installed root keys, unique chip serial number, and the issuer seed.

In another aspect of the present invention, the issuer may securely obtain the master keys and unique chip serial numbers required to support encrypted communications with mobile device. In one embodiment, the unique chip serial numbers, which are known by the device vendor, may be transmitted to the issuer along with the mobile devices themselves. In contrast, the master keys may be unknown to the device vendor, and can be generated by the issuer using the pre-installed chip information obtained from the smart card vendor and its own issuer seed value. Thus, the issuer can securely communicate with the mobile device by generating the master keys corresponding to the issuer-specific chip keys now contained in the secure element.

BRIEF DESCRIPTION OF THE DRAWINGS

Figure 1:
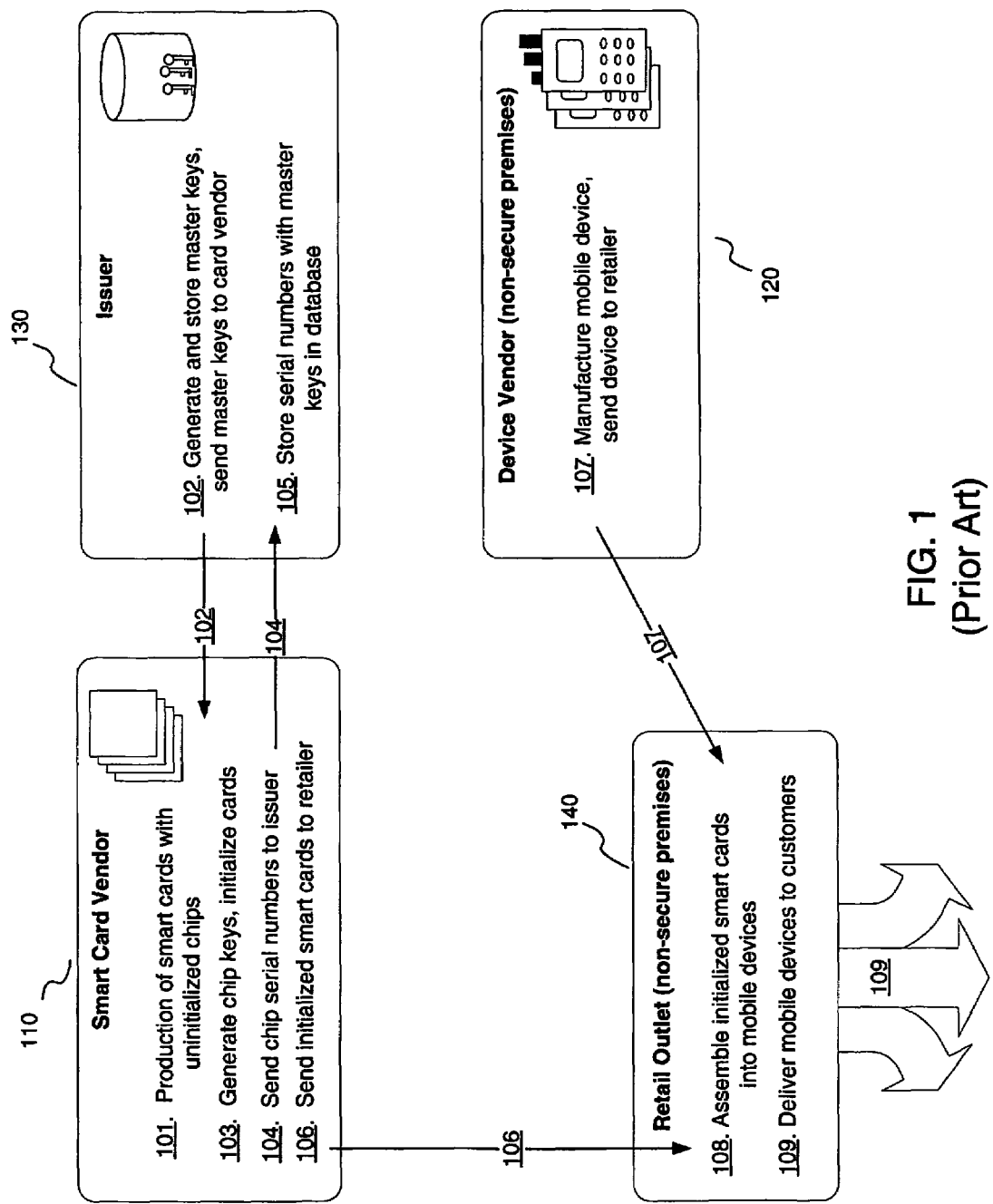
Figure 2:
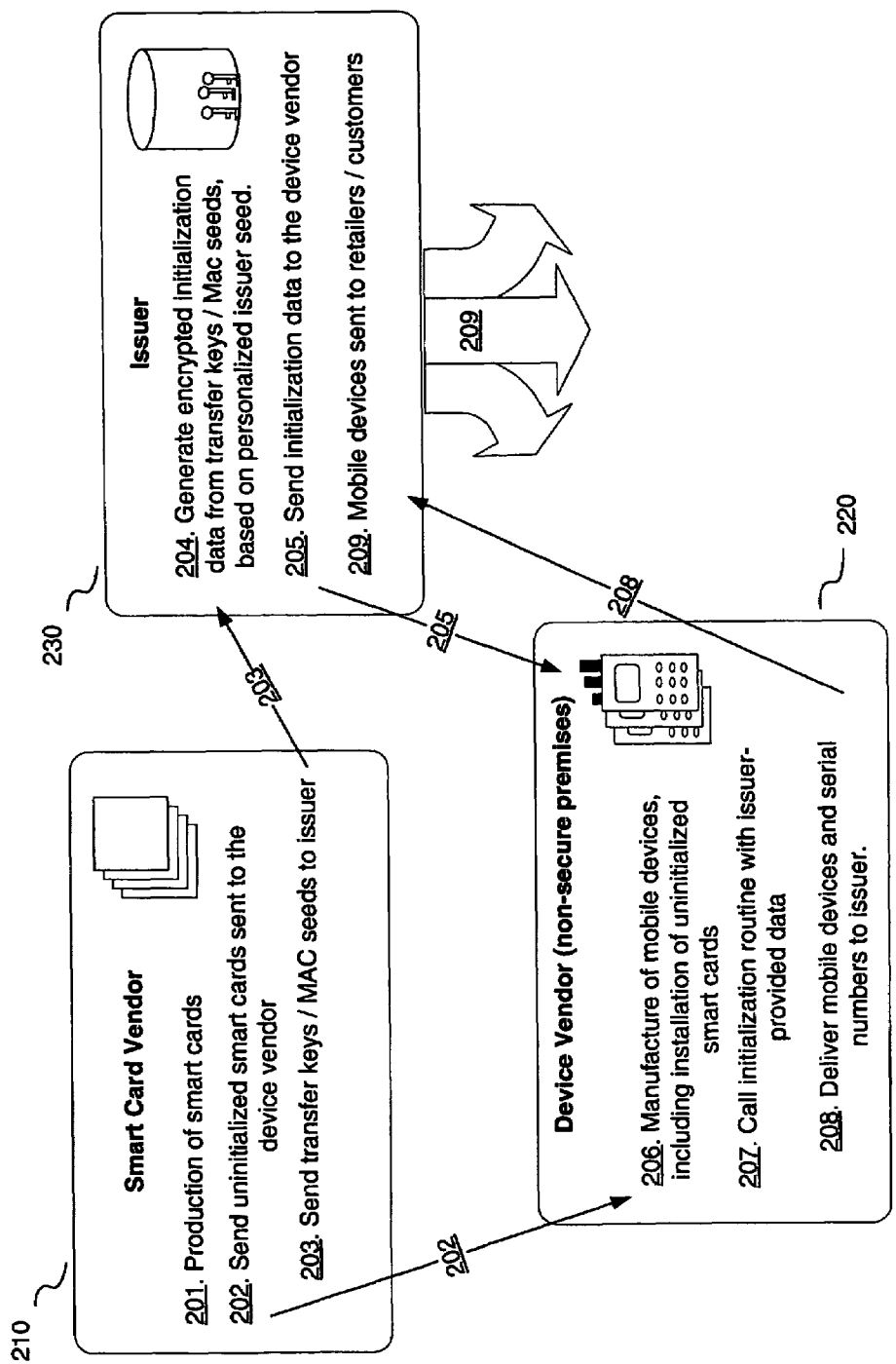
Figure 3:
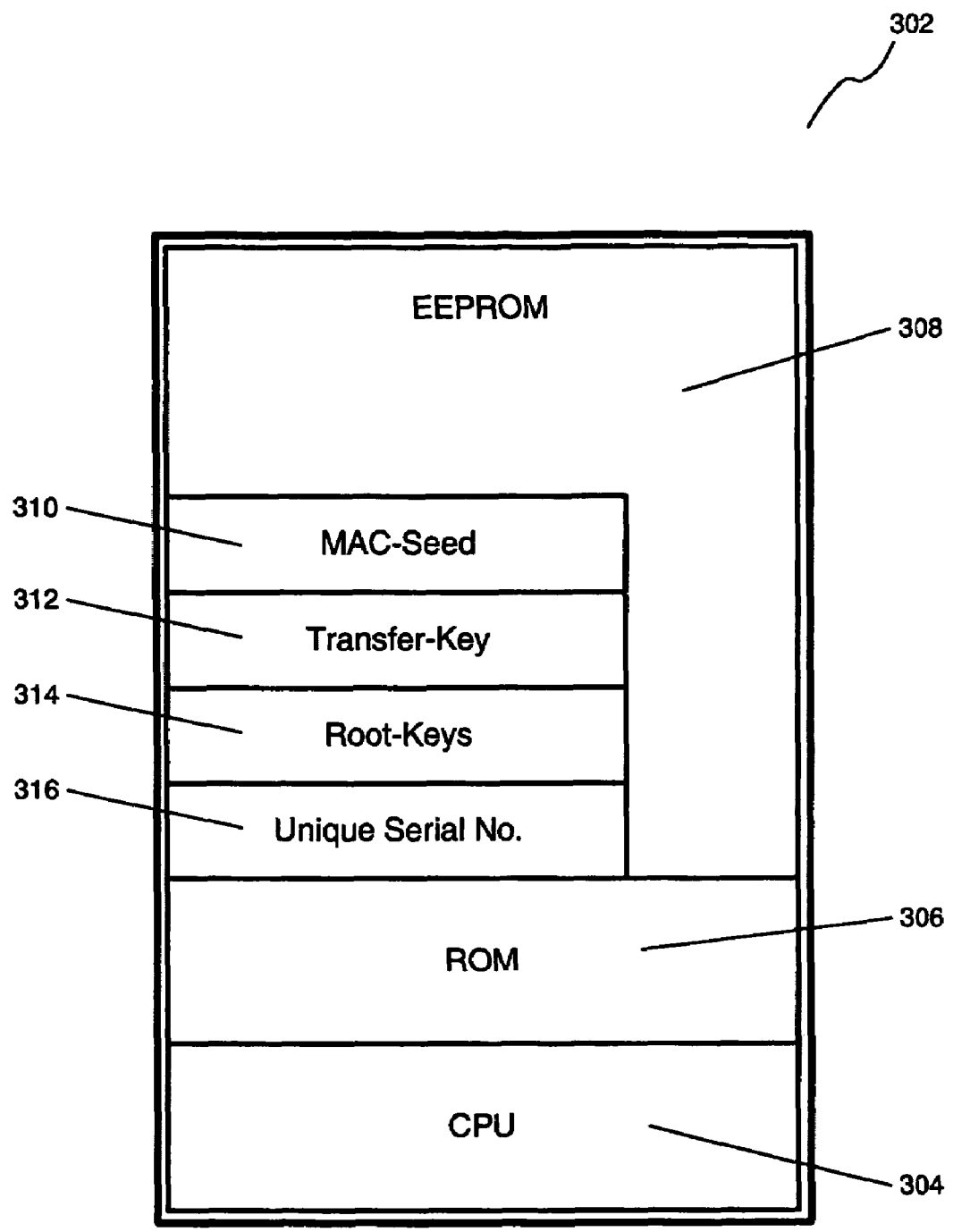
Figure 4:
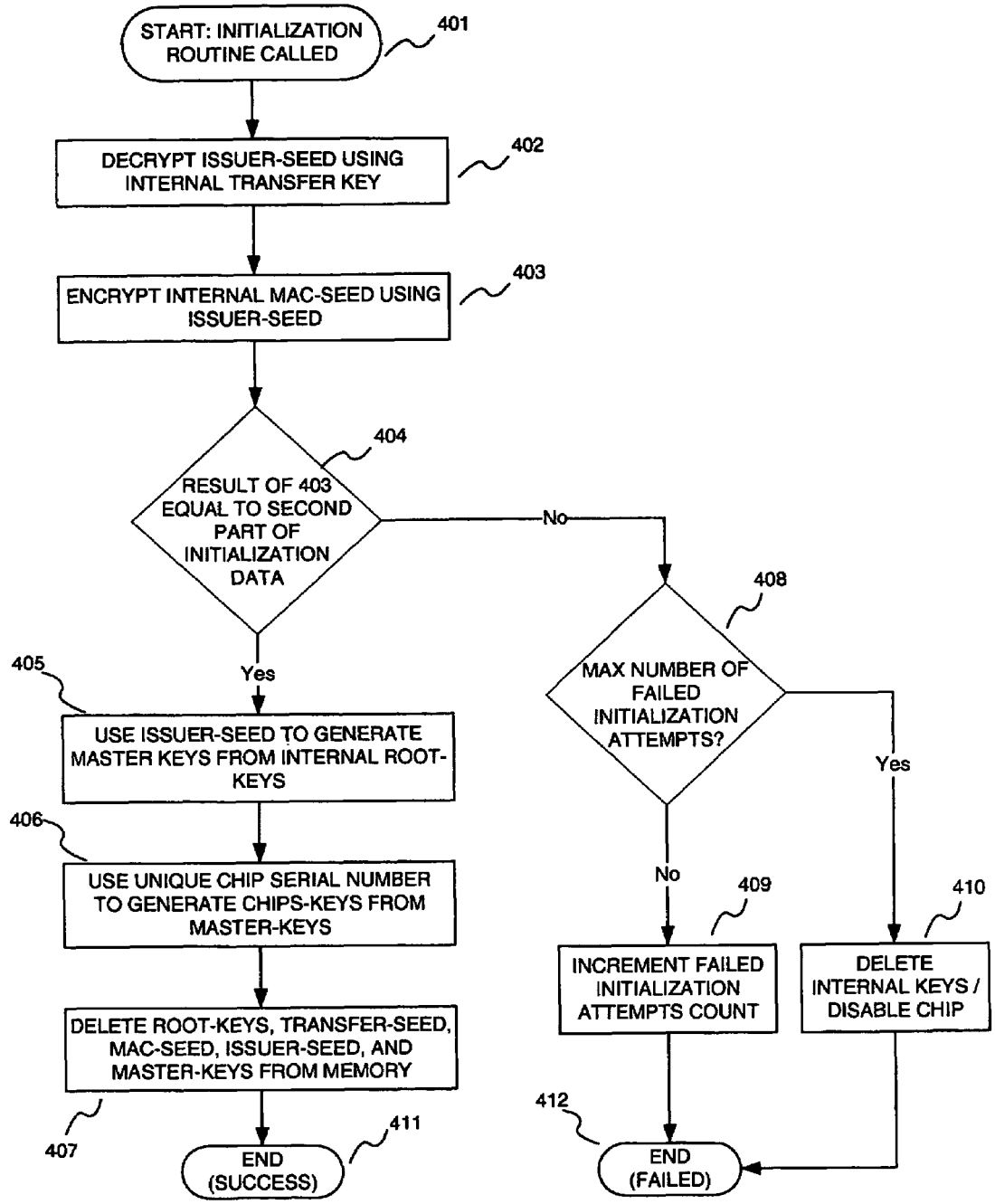
Figure 5:
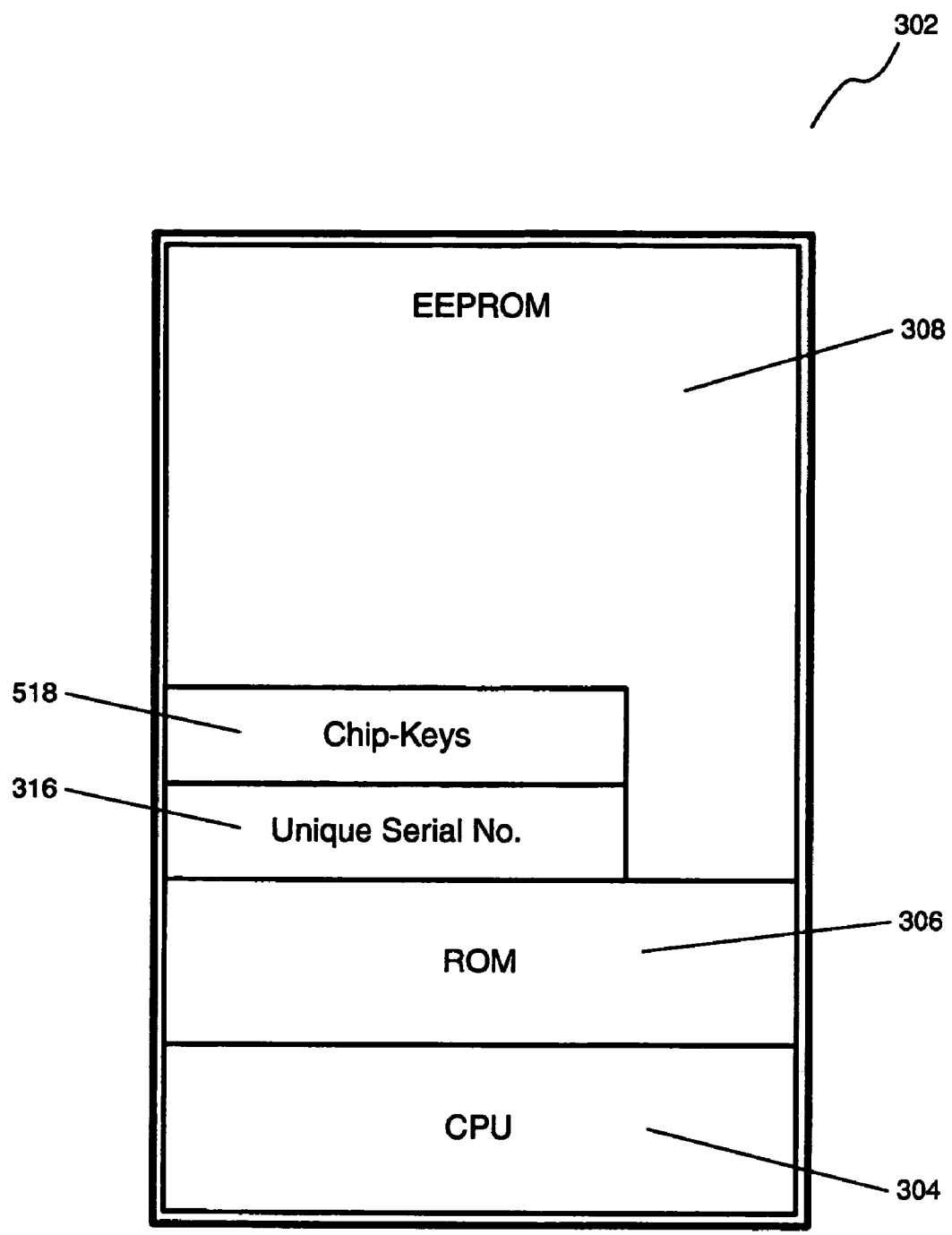
Figure 6A:
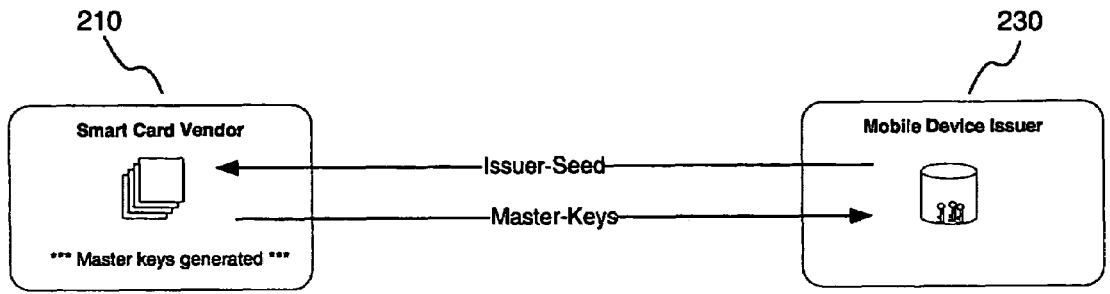
Figure 6B:
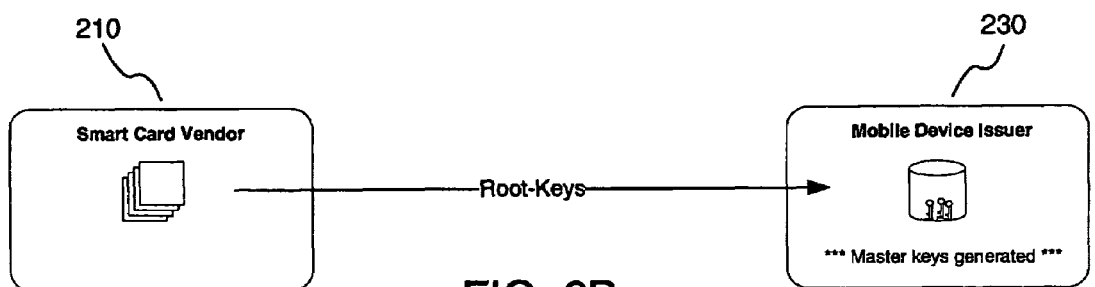
Figure 6C:
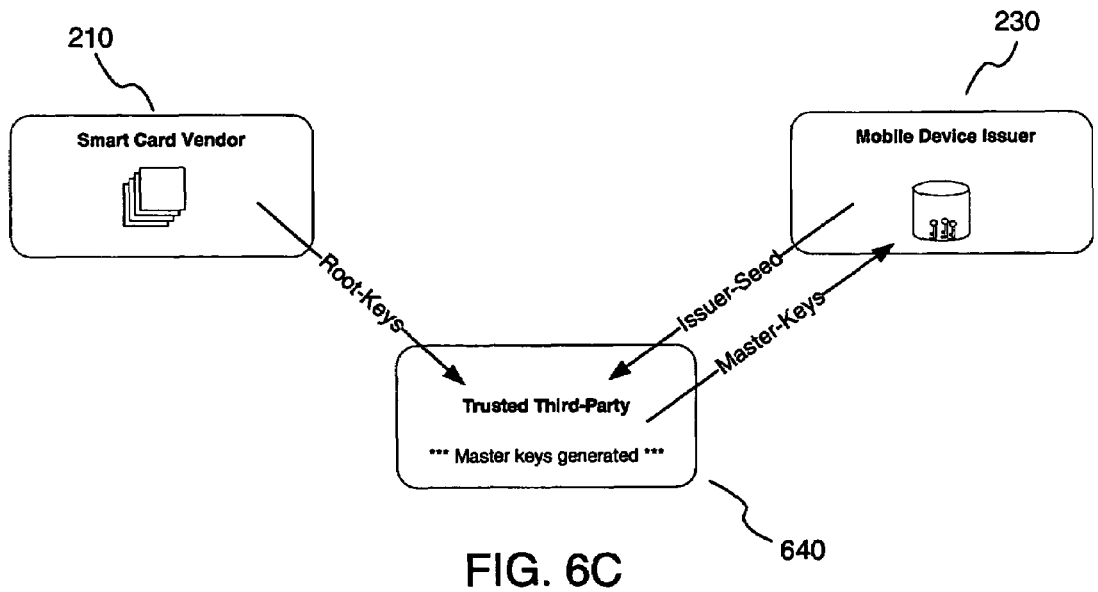
Figure 7:
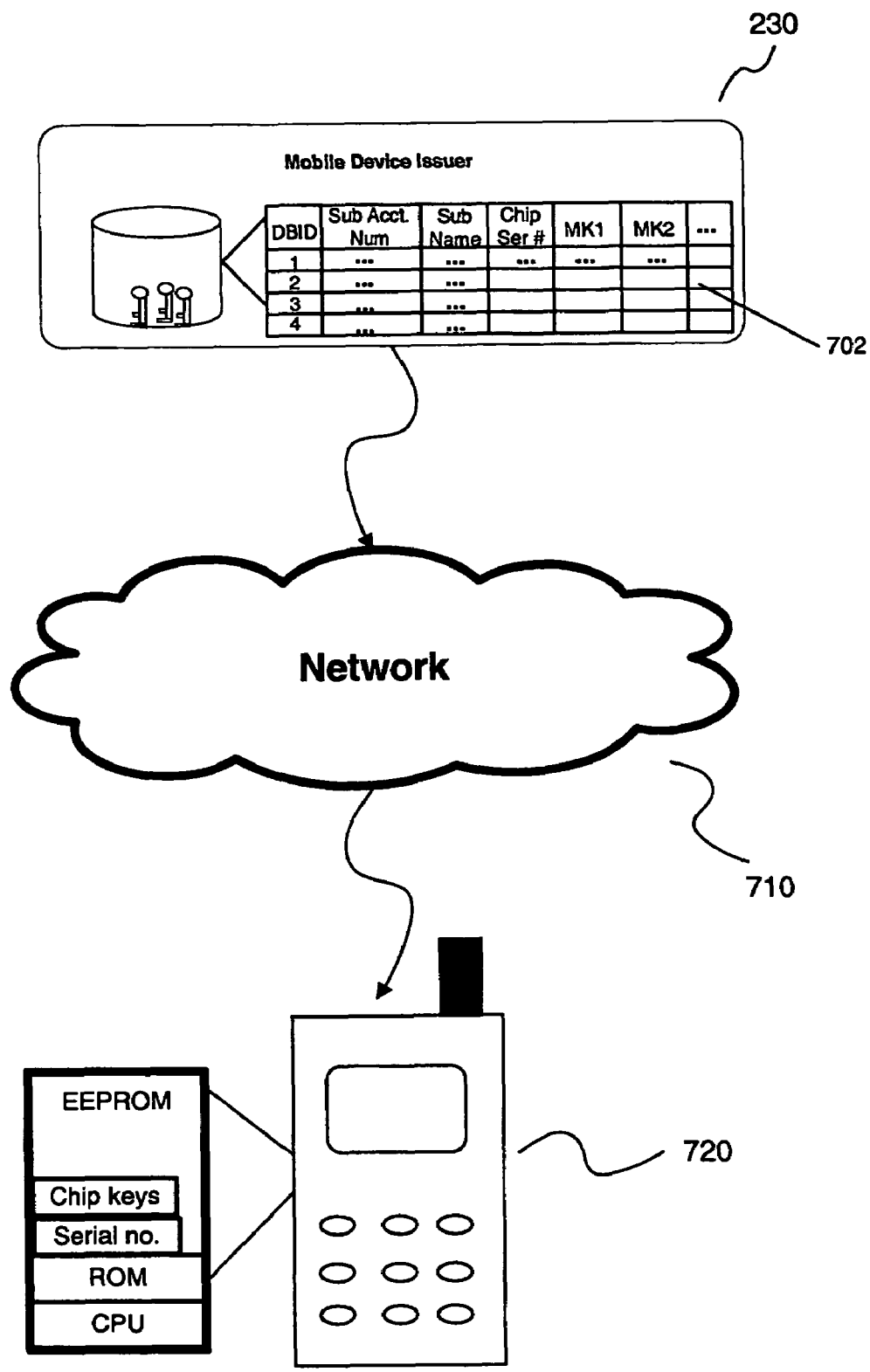

Having thus described the invention in general terms, reference will now be made to the accompanying drawings, which are not necessarily drawn to scale, and wherein:

FIG. 1 is a functional block diagram of the prior method of secure element initialization;

FIG. 2 is a functional block diagram of an improved method of secure element initialization, in accordance with preferred embodiments of the present invention;

FIG. 3 is a schematic block diagram of an integrated circuit microprocessor card in an initial state, in accordance with one embodiment of the present invention;

FIG. 4 is a flowchart of a method of initializing a secure element in accordance with one embodiment of the present invention;

FIG. 5 is a schematic block diagram of an integrated circuit microprocessor card in a "GP Ready," or initialized state, in accordance with one embodiment of the present invention;

FIGS. 6A-6C are functional block diagrams of alternative methods of generating the secure element master keys; and, FIG. 7 is a functional block diagram of a secure over-the-air communication between the issuer and the mobile device user, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring to the FIG. 2, a process diagram is shown for the installation and initialization of terminal-integrated secure element chips into mobile devices according to embodiments of the present invention. As in FIG. 1, the overall process of chip installing and initializing a chip into a mobile device requires several different tasks that may be performed by different entities.

The smart card vendor 210 manufactures cards containing secure element chips. While entity 210 is described herein as a smart card vendor, in certain embodiments, the secure element chip need not be embedded into a card at all. Rather, "smart cards" as described herein, may comprise secure elements that are designed to be soldered into the printed circuit boards of the mobile devices. Such permanently installed, or terminal-integrated, smart cards stand in contrast to standard detachable smart cards, which have secure element chips embedded into a plastic card. While the advantages of terminal-integrated smart cards are discussed herein, the present invention can also be applied to detachable secure elements such as those in SIM cards and other smart cards. With respect to the secure element itself, preferred embodiments may use integrated circuit (IC) microprocessor cards, also referred to in the industry as "chip cards." Chip cards are embedded with a microprocessor and memory to support a variety of applications. Chip cards may have built-in cryptography support, that is, built-in functions to perform storage and manipulation of large numbers.

Alternate embodiments of the invention may use other varieties of smart cards besides chip cards. Examples include integrated circuit (IC) memory cards or optical memory cards, which contain memory but no microprocessor. These embodiments using memory cards would rely on the processor of the mobile device for all data processing and would only use the smart card for data storage.

The device vendor 220 manufactures the mobile devices for use in the methods of the presently disclosed invention. In a preferred embodiment, the device vendor comprises a mobile phone manufacturer; however the present invention is not limited to any specific type mobile device. Thus, mobile phones, personal digital assistants (PDAs), laptop computers, and a variety of Internet appliances may also be used.

The issuer 230 manages the chips to support secure wireless transactions by the mobile device user. The issuer 230 typically purchases devices from the device vendor 220 and distributes those devices, through a retailer, to consumers. Thus, the issuer 230 is typically the mobile operator or mobile service provider. As discussed in detail hereinafter, the issuer 230 can be any party to whom the secure elements are personalized, and is thus the party capable of secure communication with the initialized mobile device.

The entities shown in FIG. 2 (the smart card vendor 210, the device vendor 220, and the issuer 230) are logically separated into different boxes in FIG. 2. Each box contains underlined numbers corresponding to the steps performed by that entity. However, it should be understood that certain process steps may be outsourced by an entity, or transferred from one entity to another. Two entities may also merge into a single unit. For example, if a smart card vendor and an issuer are commonly owned, the present invention retains the same advantages over other known methods for secure element chip installation and initialization.

The underlined process steps within the boxes of FIG. 2 illustrate the logical steps of an embodiment of the present invention. Note that not all steps need execute in the exact order described below. For example, the smart card vendor 210 may send the transfer keys/MAC seeds to the issuer 230 in step 203 before sending the uninitialized smart cards to the device vendor 220 in step 202. However, of course, where the data or physical components generated in one step are used in another step, the first step must occur before the second.

Referring now to the process steps shown in FIG. 2, the process begins when the smart card vendor 210 manufactures the smart cards containing pre-installed keys in step 201. The pre-installed, or initial, keys comprise root keys, or large numbers used in encrypted data transfers, which are known to, and saved by, the smart card vendor 210. As is discussed in detail below, the root keys can later be used to 'personalize' the card, or set cryptography keys only known to the issuer.

According to embodiments of the present invention, the pre-installed root keys may be the same for each individual smart card manufactured, and will only later be 'diversified' by the issuer-specific seed and unique chip serial numbers. This process is discussed in detail below. Also, note that the uninitialized smart cards contain other data besides the pre-installed root keys, such as the MAC seed, transfer key, and unique chip serial number, which are discussed in detail below. The pre-installed internal MAC seed and transfer key may also be the same for each smart card manufactured by the same smart card vendor 210. In step 202, the physical uninitialized smart cards are sent to the device vendor 220. As is discussed below, although the device vendor 220 physically possesses the secure element chip, the pre-installed keys and other data on the chip are not necessarily accessible to the device vendor 220. In fact, in certain embodiments the device vendor 220 can be considered an untrusted entity and may never have access to the pre-installed root keys, transfer key, and MAC seed, which are stored internally on the uninitialized smart card. Only the unique chip serial number, which is a permanent and unchangeable value, might be public information accessible to the device vendor 220.

In step 203, the smart card vendor 210 sends the issuer 230 the transfer keys and MAC seeds corresponding to the secure element chips of the smart cards sent to the device vendor 220. A transfer key is an encryption key stored securely in the chip. It is used to protect the confidentiality of the security sensitive data transferred to the chip from an external source. A MAC seed is a random seed value programmed into the secure element chip by the smart card vendor for the purpose of integrity checking during the initialization process. The use of transfer keys and MAC seeds is known as such in the field of encrypted communications, and will be discussed in detail below. The issuer 230 uses this data, along with an issuer-specific seed value (issuer seed), to generate personalized encrypted initialization data in step 204. The issuer seed may be a random number generated by the issuer 230, used for the generation of issuer-specific chip keys and master keys based on the pre-installed root keys of the secure element. The issuer seed is a secure value that should not be disclosed to any untrusted party. In some embodiments, the issuer seed is a random 16-byte integer.

In step 205, the initialization data is sent from the issuer 230 to the device vendor 220. Since this initialization data is encrypted, it need not be communicated to the mobile device over a secure channel. Indeed, in certain embodiments, the communications network between the issuer 230 and device vendor 220 is not secure, and the device vendor 220 may not be a trusted entity. As is further discussed below, although the device vendor 220 now possesses both the uninitialized smart card, and the initialization data, none of the secure underlying information needs to be exposed to the device vendor 220. The techniques discussed herein allow the pre-installed root keys, transfer key, and MAC seed, as well as the issuer seed to remain hidden from the device vendor 220. In contrast, the unique chip serial number may be public information, readily available to the device vendor. Certain embodiments of the present invention involve occasions where the device vendor 220 is unsecure or untrusted, and thus the pre-installed root keys, transfer key, and MAC seed, as well as the issuer seed, must remain completely inaccessible to a device vendor in possession of the uninitialized smart cards, the unique chip serial numbers, and the encrypted initialization data.

Returning to steps 203-204, in alternative embodiments, different methods for generating the encrypted initialization data are used. For example, the smart card vendor 210 may deliver a security module to the issuer 230. The security module comprises tamper-proof memory, which contains the transfer keys and MAC seeds, but denies the issuer 230 any direct access to this data. Instead, the issuer 230 passes its own issuer seed to the security module, which internally generates the encrypted initialization data and returns this encrypted data to the issuer 230.

In preferred embodiments, the encrypted initialization data comprises two separate pieces of encrypted data: the issuer seed encrypted with the transfer key, and the MAC seed encrypted with the issuer seed. Other embodiments allow for other pieces of data, which make up the initialization data, as long as the data allows for securely verifying the secure element initialization attempt.

In step 206, the device vendor 220 manufactures the mobile devices, which may include embedding the uninitialized smart cards received from the card vendor 210, such that the smart cards are terminal-integrated, or permanently installed into the mobile device. By including the step of smart card/chip card embedding into the mobile device manufacturing process, the security of the mobile device and the efficiency of the manufacturing process can be improved. In step 207, the device vendor 220 initializes the smart cards by invoking an initialization routine stored in the operating system of the smart card chip. The device vendor 220 calls this initialization routine, passing into the routine an input parameter comprising the encrypted initialization data received from the issuer 230. The initialization routine, discussed in further detail below, will initialize the smart card embedded in the mobile device, personalizing the smart card chip for the issuer 230. The issuer 230 can now securely manage the device and provide mobile customers with secure data transfer capabilities. In step 208, the device vendor 220 delivers the initialized mobile devices to the issuer 230 for distribution to retailers or consumers, along with the corresponding chip serial numbers of the secure element in each device. The issuer 230 may store these unique chip serial numbers in a secure database, to facilitate future communications with the mobile device. In step 209, the issuer 230 distributes these personalized mobile devices to customers. As stated above, this mobile device distribution may be done directly from the issuer to customers, or may be done through a retailer or other third party.

The system and method exemplified in FIG. 2 improves upon the prior art techniques for installing and initializing secure element chips into mobile devices in several respects. In preferred embodiments, uninitialized (or non-pre-personalized) chips may be permanently installed into a mobile device during manufacturing. At a later time coordinated by the parties involved, the terminal-integrated chip can be personalized to a specific issuer through a simple series of data transactions between the card vendor 210, device vendor 220, and issuer 230. No hardware need be shipped between parties to initialize another device. Devices can be quickly and easily personalized, or tailored to a specific issuer, without exposing the secure cryptographic keys to the device vendor 220 or other untrusted parties.

As discussed above, prior art systems have typically been directed to detachable smart cards in mobile devices, wherein the issuer-specific tailoring of the secure element chips is done before the chips are installed into the devices. In contrast, the present invention further supports terminal-integrated chip installation, wherein the secure element chip is permanently installed before the issuer-specific tailoring, or personalization. An additional advantage of the terminal-integrated embodiments of the present invention relates to mobile devices with radio frequency identification (RFID) communication modules used to perform secure transactions. RFID uses radio-frequency signals transmitted and received between RFID communication modules, such as RFID tags or transponders, to provide automatic identification methods. These communication modules are referred to as either active or passive, depending on whether an internal power source is associated with the module. Mobile terminals such as phones or PDAs may be equipped with RFID communication modules, such that the module includes an interface to a terminal-integrated secure smart card element. The memory of the terminal-integrated secure element may contain additional data such as credit card or bank account information, along with secure passwords or PINs. The users of the mobile device are now able to conduct financial transactions through the RFID interface for securely accessing and sharing the data in the secure element memory.

For example, a user carries her mobile device into a store or restaurant. The mobile device has a terminal-integrated secure element, on which the user's credit card information is stored. The mobile device also comprises an RFID tag, or transponder, for communicating information to a corresponding RFID transceiver installed in the store or restaurant to facilitate financial transactions. When the user wishes to pay for her purchase, she may simply confirm the amount of the purchase and hold her mobile device near the store's RFID transceiver to complete the transaction. The internal RFID-secure element interface may securely access the user's credit card information from the secure element memory, and make this information available through the RFID tag. This sort of card-less transaction is more convenient for both parties, and may be more secure than typical in-store credit card purchases.

Referring to FIG. 3, a block diagram of an initial operating system state of a secure element chip 302 is shown, in accordance with one embodiment of the present invention. A secure element chip containing a microprocessor and memory, and running an operating system, may be embedded into a smart card, thus enabling the smart card to perform functions related to the attached mobile device. FIG. 3 illustrates an uninitialized secure element chip 302. The chip 302 contains a CPU 304, and read-only memory (ROM) 306 which stores the operating system. The secure element chip 302 also contains electrical erasable programmable read-only memory (EEPROM) 308. EEPROM is a variation of the read-only memory (ROM) commonly used by computers to persist data even after the power source to the memory is turned-off. However, unlike conventional ROM or programmable read-only memory (PROM), EEPROM may be programmed then erased by exposing the memory to an electrical charge. Thus, EEPROM may be erased and rewritten multiple times, yet will retain its contents when the device is turned off.

The EEPROM 308 in FIG. 3 illustrates the initial state of the operating system. That is, FIG. 3 shows the state of the secure element chip 302 when it is shipped from the smart card vendor 210 to the device vendor 220. The uninitialized chip 302 has initial key values built into the EEPROM 308: the MAC seed 310, the transfer key 312, the root keys 314, and the unique serial number 316.

The MAC seed 310 is a random seed value stored in the EEPROM 308 for the purpose of integrity checking during the initialization process. Like the other data stored inside the EEPROM 308 of FIG. 3, the MAC seed 310 is stored typically in the system area of the EEPROM 308, designated for internal use only. However, according to embodiments of the present invention, also other arrangements for storing the MAC seed 310 can be made. All system area storage can only be used by operating system functions; this storage is inaccessible from outside of the chip. Thus, the MAC seed 310, once programmed into the EEPROM 308 by the smart card vendor 210, can not be discovered by the device vendor 220 in possession of the chip 302.

The transfer key 312, also stored typically in the OS system area of the EEPROM 308, is used to protect the confidentiality of the security sensitive data transferred to the chip 302 from an external source. In certain embodiments, the transfer key 312 may be a 192-bit 3-DES key, comprising three 64-bit encryption keys which are used in serial to encrypt/decrypt a set of data three times (the first encryption is encrypted with the second key, and the resulting cipher text is again encrypted with the third key).

The root keys 314, also stored in the OS system area of the EEPROM 308, are used for the generation of the issuer-specific master keys. This process takes place during the initialization routine, which is described in detail below. Similar to the transfer key 312, each of the root keys may be a 192-bit 3-DES key. In some embodiments, three root keys (RootKey1, RootKey2, RootKey3) may be stored in each uninitialized secure element chip 302.

Each secure element chip 302 also initially contains a unique serial number 316 written typically into the OS system area of the EEPROM 308. However, according to other embodiments of the present invention, different arrangements for storing the unique serial number 316 can be made. Each secure element chip 302 is given a different serial number. In certain embodiments, the unique serial number is 16 digits long, and cannot be changed after it is written into the EEPROM 308.

While the methods presented herein do not depend on a secure element operating system, certain embodiments involve secure elements running a JavaCard with Global Platform operating system. For example, the invention can be used to securely generate Issuer Security Domain keys of a Global Platform Java card, whereby the initialized chip will contain Issuer Security Domain with chip-specific keys, which keys have been generated from issuer-specific master keys diversified with the unique chip serial number. The unique chip serial number may be constructed, for example, from the card production life cycle (CPLC) data on the secure element chip. It may be constructed from several CPLC data fields, such as the IC fabrication date, the IC serial number, and the IC batch identifier.

Referring to FIG. 4, a flow diagram is shown illustrating the initialization routine performed by the operating system of the smart card chip, in accordance with one embodiment of the present invention. FIG. 4 corresponds to step 207 of FIG. 2, discussed above, but provides greater details regarding the execution of this routine. This routine initializes the operating system of the smart card chip 302, and generates the master and chip keys required for secure communication with the issuer 230. As discussed above, the routine is invoked by the device vendor 220 in step 401, which passes in the encrypted initialization data received from the issuer 230 as an input parameter. As stated above, the encrypted initialization data may comprise two separate pieces of encrypted data, or two parameters: the issuer seed encrypted with the transfer key, and the MAC seed encrypted with the issuer seed.

The initialization routine first performs an integrity check on the input parameters to determine the validity of the encrypted initialization data received from the device vendor 220. To perform this integrity check, the initialization routine decrypts the first input parameter with the internal transfer key stored in its EEPROM in 402. Since this first parameter is the issuer's 230 seed value encrypted with the smart card vendor's 210 transfer key, the value decrypted in step 402 will be the issuer seed, as long as the transfer key used to form the initialization data is equal to the internal transfer key of the secure element. Next, in step 403, the initialization routine encrypts the internal MAC seed stored in its EEPROM with the decrypted issuer seed of step 402. The routine now compares the value from step 403 with the second initialization input parameter in step 404. Recall that the second input parameter is the MAC seed provided by the smart card vendor 210 encrypted with the issuer seed. Therefore, if the input parameters contain valid initialization data, that is, a transfer key and MAC seed matching the transfer key and MAC seed stored internally in the chip's EEPROM, and a consistent issuer seed, then the values compared at step 404 will match.

If the comparison in step 404 fails, then the routine will conclude that invalid initialization input has been passed in and the chip can not be initialized. Some embodiments allow an infinite number of initialization attempts, and thus steps 408-410 are optional and may be replaced by a direct line to the failed routine end 412. However, certain alternative embodiments of the invention will not permit initialization after a fixed number of failed attempts. When this fixed number is reached, the initialization routine will disable or erase portions of the chip OS, preventing any future routine calls from successfully initializing the chip. Such embodiments can protect card manufacturers, device manufactures, and issuers from piracy and security threats. For example, an unauthorized party in possession of the uninitialized device may repeatedly call the initialization routine, attempting to hack the chip OS and initialize the chip with their own seed value rather than that of the issuers. Disabling initialization after a fixed number of attempts may thwart such efforts. These embodiments can also improve efficiency in the initialization process by quickly identifying and disabling a defective card to avoid excessive failed initialization attempts. Steps 408-410 illustrate this feature. The EEPROM of the chip operating system stores number values corresponding to the maximum number of allowable initialization attempts, and the previous number of failed initialization attempts of this chip. In step 408, after a failed initialization attempt, these number values are compared to determine if the chip operating system has reached its maximum number of failed attempts. If not, the stored value corresponding to the number of failed attempts is incremented in step 409, and the initialization routine exits. However, if the chip operating system has reached its maximum number of failed attempts, then in step 410 the chip operating system will delete its initial keys and other selected EEPROM data to render future initialization impossible. In step 410, the chip operating system may be configured such that pre-defined chip keys are set up, and these pre-defined keys are thereafter designated as the chip keys. In alternative embodiments, step 410 comprises erasing all EEPROM initialization data, thereafter completely denying the use of the chip.

Returning to the comparison in step 404, if the values compared match, then the initialization routine has accepted the input data and will now proceed to generate the master and chip keys required for secure data transfers. First, in step 405, the routine generates issuer-specific master keys by diversifying each of the pre-installed root keys, stored internally in the EEPROM of the chip OS, with the issuer seed. That is, the master keys are computed as a one-way function of the internal root keys and the issuer seed. In step 406, the routine diversifies each of these master keys with the unique chip serial number from the EEPROM of the chip OS, yielding a set of chip keys corresponding to the master keys. That is, the chip keys are computed as a one-way function of the master keys and the unique chip serial number. Finally, in step 407, the initialization routine completes the initialization by deleting the master keys, root keys, transfer key, issuer seed, and MAC seed from the chip memory. Only the newly-generated chip keys and the unique chip serial number are retained in the EEPROM of the chip's OS. The routine may then exit in step 411 and return a success code to the caller.

Referring to steps 406-407, the generation of diversified keys is a well-known practice in encryption and authentication technologies. The advantage of diversified keys on a mobile device is that if the chip keys are extracted from the device by an attacker and used fraudulently, the compromised device can be traced and subsequently blacklisted. Further, since the diversification process comprises a complex one-way function, the attacker will not be able to learn the master keys or issuer seed from the extracted chip keys.

Referring to FIG. 5, a block diagram corresponding to the initialized operating system state of secure element chip 302 is shown in accordance with one embodiment of the present invention. FIG. 5 shows the same chip that was uninitialized in FIG. 3, after a successful initialization routine call, as discussed above in relation to FIG. 4. The chip shown in FIG. 5 is in an initialized state. As in FIG. 3, the chip 302 may contain a CPU 304, and read-only memory (ROM) 306, which may store an operating system. The chip 302 also contains an EEPROM 308. As is shown in FIG. 5, the EEPROM 308 no longer contains a MAC seed, transfer key, or root keys, as it did in its uninitialized state. After the successful execution of the initialization routine, the EEPROM 308 contains only the chip keys 518 and the unique chip serial number 316. As previously mentioned, while the methods presented herein do not depend on a secure element operating system, certain embodiments involve secure elements running a JavaCard with Global Platform operating system. In such embodiments, FIG. 5 may correspond to the "GP ready" mode of the JavaCard Global Platform operating system, and the ROM 306 may store the Global Platform OS.

The above-disclosed embodiments enable encrypted communication between the issuer 230 and a user of the mobile device. Encrypted communications allow device users to make secure transactions over mobile networks, such as transmissions of confidential information. Encrypted communications may also be initiated by the issuer 230 to perform management functions on the mobile device, such as hardware maintenance and configuration, or software updates. As mentioned above, the chip keys are embedded securely into the EEPROM 308 of the operating system of the mobile device. In preferred embodiments, these chip keys are not exposed to the device user, but can only be reached by internal operating system routines, such as those built-in to the secure element chip to transmit and receive encrypted communications. The issuer's master keys correspond to the chip keys of the mobile devices to enable encrypted communications between the two parties. The issuer 230 can then use master keys in its possession to generate actual chip keys. To generate the chip keys for a specific secure element, the issuer 230 first obtains the unique chip serial number, which the device vendor 220 may send to the issuer, for example, for storage in the issuer's database. The issuer 230 may then diversify the master keys with the unique chip serial number. Thereafter, both the secure chip in the mobile device and the issuer have the chip-specific keys, which can be used for securing the communication between the issuer and the mobile device. This description of encrypted communications between the two parties is merely a simplified overview of the many variations of encryption possible with the infrastructure of key values, seeds, and encryption routines described herein, it does not limit the present invention to any specific method of encrypted communications.

However, in certain embodiments, before encrypted communication can take place, the issuer 230 must have the unique chip serial number and the master keys for the target device. As discussed above, the device vendor 220 returns the unique chip serial numbers to the issuer 230 after the successful initialization of the mobile device. Alternatively, an issuer without the unique chip serial number may obtain that number from other public sources, or from the device itself. However, the issuer 230 still needs the master keys corresponding to the serial numbers before communicating with the device user.

Referring now to FIG. 6A-6C, three diagrams illustrating alternative methods of master key generation are shown in accordance with the present invention. As mentioned above, the issuer 230 will participate in direct encrypted communications with the mobile device. As is well-known, the issuer 230 needs the master keys corresponding to the chip keys of the mobile device before encrypted communication between the two is possible. In order to generate these master keys, the initial root keys of the chip are diversified with the issuer seed, mirroring the master key generation process which took place in step 405 of the initialization routine shown in FIG. 4. Since both the root keys and the issuer seed are required to generate the master keys, cooperation between the card vendor 210 and the issuer 230 is required. Three different embodiments are shown in FIGS. 6A-6C to generate the master keys and allow the issuer 230 to securely communicate with the mobile device.

In FIG. 6A, the issuer 230 securely transmits the issuer seed to smart card vendor 210. The card vendor 210 may then generate the master keys and securely return them to issuer 230. The issuer 230 can now use the master keys to securely communicate with the mobile device. Alternatively, in FIG. 6B, the card vendor 210 securely transmits the root keys to the issuer 230. The issuer 230 can then generate and securely store these values. In FIG. 6C, a trusted third-party 640 is used to generate the master keys. The card vendor 210 securely discloses the root keys to the trusted third-party 640, while the issuer 230 securely discloses the issuer seed. The trusted third-party 640 now generates the master keys and securely delivers them to the issuer 230.

Once the chip keys are securely embedded into the mobile device, and the issuer 230 is in possession of the unique chip serial numbers and the corresponding master keys, encrypted over-the-air (OTA) transactions can take place between the issuer 230 and the mobile device. FIG. 7 illustrates such a transaction according to one embodiment of present invention. The issuer 230 looks up the unique chip serial number corresponding to customer subscriber information, such as the subscriber name or subscriber account number in database 702. The issuer 230 may then generate and formats a message to the destination mobile device 720, using the unique chip serial number to form the destination address. The issuer 230 can then use master keys and the unique chip serial number to generate the chip keys, as described above. Alternatively, the chip keys for this specific secure element may have been previously generated and securely stored in the issuer's 230 database, in which case these chip keys may be directly retrieved from the database instead of being regenerated. Once both the secure chip in the mobile device 720 and the issuer 230 have the chip-specific keys, these chip keys can be used for securing the communication between the issuer 230 and the mobile device 720. In one embodiment, both parties may encrypt message content with one or more of the chip keys before transmitting a message over a non-secure public network 710, such as the internet or an over-the-air cellular network. When the message is received, the receiving party can decrypt the message content using the chip keys.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving a secure element comprising memory, wherein the memory of the secure element includes pre-installed root keys, a transfer key, and a unique serial number;
   receiving secure element tailoring information associated with a wireless terminal issuer, wherein said secure element tailoring information comprises an issuer seed encrypted with an encrypting transfer key corresponding to the transfer key stored in the memory, and an encrypted MAC seed encrypted with the issuer seed, wherein the encrypted MAC seed corresponds to a MAC seed stored in the memory;
   installing the secure element into a wireless terminal; and
   initializing the secure element by configuring the secure element to support secure communication through the wireless terminal, wherein said configuring of the secure element is based on the received tailoring information and the pre-installed root keys and the unique serial number, and further wherein installing the secure element occurs before initializing the secure element.

2. The method of claim 1, wherein said secure element is an integrated circuit microprocessor card.

3. The method of claim 1, wherein said wireless terminal is a mobile phone.

4. The method of claim 1, wherein said secure element comprises an operating system.

5. The method of claim 4, wherein said operating system is a JavaCard with Global Platform compliant operating system.

6. The method of claim 1, farther comprising the step of delivering the unique serial number to the wireless terminal issuer after the initialization of the secure element.

7. The method of claim 1, wherein the secure element is installed into the wireless terminal permanently.

8. A method comprising:
   receiving a secure element comprising memory, wherein the memory of the secure element includes pre-installed root keys and a unique serial number;
   receiving secure element tailoring information associated with a wireless terminal issuer;
   installing the secure element into a wireless terminal; and
   initializing the secure element by configuring the secure element to support secure communication through the wireless terminal, wherein said configuring of the secure element is based on the received tailoring information and the pre-installed root keys and the unique serial number, wherein installing the secure element occurs before initializing the secure element, and wherein initializing the secure element comprises:
      diversifying the pre-installed root keys with an issuer seed corresponding to the secure element tailoring information associated with the wireless terminal issuer to generate master keys;
      temporarily storing the master keys in the memory of the secure element;

diversifying the master keys with the unique serial number to generate chip keys; and, storing the chip keys in the memory of the secure element.

9. The method of claim 8, wherein the step of initializing the secure element further comprises the step of permanently removing the root keys and master keys from the memory of the secure element after storing the chip keys.

10. The method of claim 8, wherein the issuer seed corresponding to the secure element tailoring information associated with the wireless terminal issuer is encrypted.

11. The method of claim 10, wherein said secure element tailoring information comprises:

the issuer seed encrypted with a transfer key, wherein the transfer key corresponds to a transfer key stored in the memory of the secure element; and, a MAC seed encrypted with the issuer seed, wherein the MAC seed corresponds to a MAC seed stored in the memory of the secure element.

12. An apparatus, comprising:

a slot adapted to receive a secure element;

a processor; and memory storing instructions that when executed cause the processor to perform:

receiving secure element tailoring information associated with an issuer, wherein said secure element tailoring information comprises an issuer seed encrypted with an encrypting transfer key corresponding to a transfer key stored in the secure element, and an encrypted MAC seed encrypted with the issuer seed, wherein the encrypted MAC seed corresponds to a MAC seed stored in the secure element; and initializing the secure element to support secure communication through the apparatus, wherein said initialization of the secure element is based on the received secure element tailoring information, pre-installed root keys, and a unique serial number, farther wherein the pre-installed root keys and the unique serial number are stored in the secure element, and wherein initializing the secure element occurs after the secure element has been installed in the apparatus.

13. The apparatus of claim 12, wherein the secure element is an integrated circuit microprocessor card.

14. The apparatus of claim 12, wherein said apparatus is a mobile phone.

15. The apparatus of claim 12, wherein the secure element comprises an operating system.

16. The apparatus of claim 15, wherein said operating system is a JavaCard with Global Platform compliant operating system.

17. The apparatus of claim 12, wherein the instructions, when executed cause the processor to further perform: delivering the unique serial number to the issuer after the initialization of the secure element.

18. The apparatus of claim 12, wherein the secure element is installed into the apparatus permanently.

19. An apparatus comprising:

a slot adapted to receive a secure element;

a processor; and memory having instructions stored thereon that when executed cause the processor to perform:

receiving secure element tailoring information associated with an issuer; and initializing the secure element to support secure communication through the apparatus, wherein said initializing of the secure element is based on the received secure element tailoring information, pre-installed root keys, and a unique serial number, wherein the pre-installed root keys and the unique serial number are stored in the secure element, wherein said initializing of the secure element occurs after the secure element has been installed in the apparatus, and wherein said initializing of the secure element comprises:

diversifying the pre-installed root keys with an issuer seed corresponding to the secure element tailoring information associated with the issuer to generate master keys;

temporarily storing the master keys in the secure element;

diversifying the master keys with the unique serial number to generate chip keys; and, storing the chip keys in the secure element.

20. The apparatus of claim 19, wherein the initializing of the secure element further comprises permanently removing the root keys and master keys from the secure element after storing the chip keys.

21. The apparatus of claim 19, wherein the issuer seed corresponding to the secure element tailoring information associated with the issuer is encrypted.

22. The apparatus of claim 21, wherein said secure element tailoring information comprises:

the issuer seed encrypted with a transfer key, wherein the transfer key corresponds to a transfer key stored in the secure element; and, a MAC seed encrypted with the issuer seed, wherein the MAC seed corresponds to a MAC seed stored in the secure element.

23. One or more computer readable media having computer readable instructions stored thereon that, when executed, cause a processor to perform:

receiving secure element tailoring information associated with a wireless terminal issuer, wherein said secure element tailoring information comprises an issuer seed encrypted with an encrypting transfer key corresponding to a transfer key stored in a secure element, and an encrypted MAC seed encrypted with the issuer seed, wherein the encrypted MAC seed corresponds to a MAC seed stored in the secure element; and initializing the secure element to support secure communication through a wireless terminal, wherein said initialization of the secure element is based on the received secure element tailoring information, pre-installed root keys, and a unique serial number, further wherein the pre-installed root keys and the unique serial number are stored in the secure element, and wherein initializing the secure element occurs after the secure element has been installed.

24. The computer readable media of claim 23, wherein the secure element is an integrated circuit microprocessor card.

25. The computer readable media of claim 23, wherein said wireless terminal is a mobile phone.

26. The computer readable media of claim 23, wherein the secure element comprises an operating system.

27. The computer readable media of claim 26, wherein said operating system is a JavaCard with Global Platform compliant operating system.

28. The computer readable media of claim 23, wherein the instructions, when executed, further cause the processor to perform: delivering the unique serial number to the wireless terminal issuer after the initialization of the secure element.

29. The computer readable media of claim 23, wherein the secure element is installed into the wireless terminal permanently.

30. One or more computer readable media having computer readable instructions stored thereon that when executed cause a processor to perform:
receiving secure element tailoring information associated with a wireless terminal issuer; and
initializing a secure element to support secure communication through a wireless terminal,
wherein said initializing of the secure element is based on the received secure element tailoring information, pre-installed root keys, and a unique serial number,
wherein the pre-installed root keys and the unique serial number are stored in the secure element,
wherein said initializing of the secure element occurs after the secure element has been installed, and
wherein said initializing of the secure element comprises:
diversifying the pre-installed root keys with an issuer seed corresponding to the secure element tailoring information associated with the wireless terminal issuer to generate master keys;
temporarily storing the master keys in the secure element;
diversifying the master keys with the unique serial number to generate chip keys; and,
storing the chip keys in the secure element.

31. The computer readable media of claim 30, wherein the initializing of the secure element further comprises permanently removing the root keys and master keys from the memory of the secure element after storing the chip keys.

32. The computer readable media of claim 30, wherein the issuer seed corresponding to the secure element tailoring information associated with the wireless terminal issuer is encrypted.

33. The computer readable media of claim 30, wherein said secure element tailoring information comprises:
the issuer seed encrypted with a transfer key, wherein the transfer key corresponds to a transfer key stored in the secure element; and,
a MAC seed encrypted with the issuer seed, wherein the MAC seed corresponds to a MAC seed stored in the secure element.

34. A method comprising:
receiving a secure element comprising memory, wherein the memory of the secure element includes pre-installed root keys and a unique serial number;
receiving secure element tailoring information associated with a wireless terminal issuer;
installing the secure element into a wireless terminal; and,
initializing the secure element by configuring the secure element to support secure communication through the wireless terminal, wherein initializing the secure element comprises:
diversifying the pre-installed root keys with an issuer seed corresponding to the secure element tailoring information associated with the wireless terminal issuer to generate master keys,
temporarily storing the master keys in the memory of the secure element,
diversifying the master keys with the unique serial number to generate chip keys, and,
storing the chip keys in the memory of the secure element.

35. The method of claim 34, wherein the initializing the secure element further comprises the step of permanently removing the root keys and master keys from the memory of the secure element after storing the chip keys.

36. The method of claim 34, wherein the issuer seed corresponding to the secure element tailoring information associated with the wireless terminal issuer is encrypted.

37. The method of claim 36, wherein said secure element tailoring information comprises:
the issuer seed encrypted with a transfer key, wherein the transfer key corresponds to a transfer key stored in the memory of the secure element; and,
a MAC seed encrypted with the issuer seed, wherein the MAC seed corresponds to a MAC seed stored in the memory of the secure element.

38. An apparatus comprising:
a processor; and
memory storing instructions that when executed by the processor performs the method comprising:
receiving secure element tailoring information associated with a wireless terminal issuer; and,
initializing a secure element by configuring the secure element to support secure communication through a wireless terminal, wherein initializing the secure element comprises:
diversifying pre-installed root keys stored in a memory of the secure element with an issuer seed corresponding to the secure element tailoring information associated with the wireless terminal issuer to generate master keys,
temporarily storing the master keys in the memory of the secure element,
diversifying the master keys with a unique serial number stored in the memory of the secure element to generate chip keys, and,
storing the chip keys in the memory of the secure element.

39. The apparatus of claim 38, wherein the initializing the secure element further comprises the step of permanently removing the root keys and master keys from the memory of the secure element after storing the chip keys.

40. The apparatus of claim 38, wherein the issuer seed corresponding to the secure element tailoring information associated with the wireless terminal issuer is encrypted.

41. The apparatus of claim 40, wherein said secure element tailoring information comprises:
the issuer seed encrypted with a transfer key, wherein the transfer key corresponds to a transfer key stored in the memory of the secure element; and,
a MAC seed encrypted with the issuer seed, wherein the MAC seed corresponds to a MAC seed stored in the memory of the secure element.

42. One or more computer readable media storing computer readable instructions that, when executed, cause a processor to perform a method comprising:
receiving secure element tailoring information associated with a wireless terminal issuer; and,
initializing a secure element by configuring the secure element to support secure communication through a wireless terminal, wherein initializing the secure element comprises:
diversifying pre-installed root keys stored in a memory of the secure element with an issuer seed corresponding to the secure element tailoring information associated with the wireless terminal issuer to generate master keys, temporarily storing the master keys in the memory of the secure element, diversifying the master keys with a unique serial number stored in the memory of the secure element to generate chip keys, and, storing the chip keys in the memory of the secure element.

43. The computer readable media of claim 42, wherein the initializing the secure element further comprises the step of permanently removing the root keys and master keys from the memory of the secure element after storing the chip keys.

44. The computer readable media of claim 42, wherein the issuer seed corresponding to the secure element tailoring information associated with the wireless terminal issuer is encrypted.

45. The computer readable media of claim 44, wherein said secure element tailoring information comprises:

the issuer seed encrypted with a transfer key, wherein the transfer key corresponds to a transfer key stored in the memory of the secure element; and, a MAC seed encrypted with the issuer seed, wherein the MAC seed corresponds to a MAC seed stored in the memory of the secure element.

* * * * *